use  US008995392B2

(12) United States Patent
Sachs

(10) Patent No.: US 8,995,392 B2
(45) Date of Patent: Mar. 31, 2015

(54) TECHNIQUES FOR OPTIMIZING EFFICIENCY IN A SITUATION FOR A POSSIBLE HANDOVER OF A MOBILE TERMINAL

(75) Inventor: Joachim Sachs, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 842 days.

(21) Appl. No.: 12/995,738

(22) PCT Filed: May 29, 2009

(86) PCT No.: PCT/EP2009/003884
§ 371 (c)(1),
(2), (4) Date: Feb. 21, 2011

(87) PCT Pub. No.: WO2009/146864
PCT Pub. Date: Dec. 10, 2009

(65) Prior Publication Data
US 2011/0142006 A1    Jun. 16, 2011

Related U.S. Application Data

(60) Provisional application No. 61/059,101, filed on Jun. 5, 2008.

(51) Int. Cl.
*H04W 4/00* (2009.01)
*H04W 36/00* (2009.01)
(Continued)

(52) U.S. Cl.
CPC .......... *H04W 36/0072* (2013.01); *H04W 36/14* (2013.01); *H04W 36/36* (2013.01); *H04W 92/02* (2013.01)
USPC .......................................... 370/331; 370/335

(58) Field of Classification Search
USPC .................................................. 370/331, 335
See application file for complete search history.

(56) References Cited

U.S. PATENT DOCUMENTS 5,287,545 A * 2/1994 Kallin ........................... 455/510
5,722,072 A * 2/1998 Crichton et al. .............. 455/437
(Continued)

FOREIGN PATENT DOCUMENTS

WO    2008/038949 A1    4/2008

OTHER PUBLICATIONS

Author Unknown. ARIB TR-T12-36.938 V8.0.0. Improved Network Controlled Mobility between E-UTRAN and 3GPP2/Mobile Wi/MAX Radio Technologies (Release 8). Mar. 2008.
(Continued)

*Primary Examiner* — Ricky Ngo
*Assistant Examiner* — Dewanda Samuel
(74) *Attorney, Agent, or Firm* — Coats & Bennett, PLLC

(57) ABSTRACT

A technique is proposed for optimizing efficiency in a situation for a possible handover of a mobile terminal (106) from a first mobile access network (102) according to a first mobile access technology to a second mobile access network (104) according to a second mobile access technology different from the first mobile access technology. A method embodiment of the technique performed by the mobile terminal (106) comprises the steps of receiving information regarding an availability of at least one of the first mobile access network and the second mobile access network (104), taking a decision regarding a connection to an inter-technology interworking entity (100) adapted to interwork between the first access technology and the second access technology, and establishing a connection to the interworking entity (100) for a preparation of the handover.

26 Claims, 9 Drawing Sheets

(51) Int. Cl.
*H04W 36/14* (2009.01)
*H04W 36/36* (2009.01)
*H04W 92/02* (2009.01)

(56) References Cited

U.S. PATENT DOCUMENTS

| | | | |
|---|---|---|---|
| 5,862,480 A * | 1/1999 | Wild et al. | 455/432.2 |
| 6,546,253 B1 * | 4/2003 | Chow et al. | 455/439 |
| 6,792,283 B1 * | 9/2004 | Roberts et al. | 455/525 |
| 7,738,871 B2 * | 6/2010 | Olvera-Hernandez et al. | 455/436 |
| 7,894,400 B2 * | 2/2011 | Rahman et al. | 370/331 |
| 8,095,175 B2 * | 1/2012 | Todd et al. | 455/436 |
| 8,121,607 B2 * | 2/2012 | Fang et al. | 455/453 |
| 8,134,972 B2 * | 3/2012 | Nakamura et al. | 370/331 |
| 2001/0008523 A1 * | 7/2001 | Song | 370/335 |
| 2002/0086682 A1 * | 7/2002 | Naghian | 455/456 |
| 2006/0025169 A1 * | 2/2006 | Maciocco et al. | 455/525 |
| 2006/0092890 A1 * | 5/2006 | Gupta et al. | 370/338 |
| 2006/0104292 A1 * | 5/2006 | Gupta et al. | 370/401 |
| 2006/0194582 A1 * | 8/2006 | Cooper | 455/436 |
| 2007/0249352 A1 * | 10/2007 | Song et al. | 455/436 |
| 2011/0003595 A1 * | 1/2011 | Shan | 455/436 |

OTHER PUBLICATIONS

Choi, H.-H. et al. "A Seamless Handoff Scheme for UMTS-WLAN Interworking." IEEE Communications Society, Globecom 2004.

3rd Generation Partnership Project. 3GPP TSG SA WG2 Architecture—S2#61, S2-075605, Ljubljana, Slvenia, Nov. 12-16, 2007.

Lampropoulos, G. et al. "Media-Independent Handover for Seamless Service Provision in Heterogeneous Networks." IEEE Communications Magazine, Jan. 2008.

* cited by examiner

TECHNIQUES FOR OPTIMIZING EFFICIENCY IN A SITUATION FOR A POSSIBLE HANDOVER OF A MOBILE TERMINAL

TECHNICAL FIELD

The present invention relates to mobile communication, and in particular to methods and devices for optimizing efficiency in a situation for a possible handover of a mobile terminal from a first mobile access network according to a first mobile access technology to a second mobile access network according to a second mobile access technology different from the first mobile access technology.

BACKGROUND

A typical mobile communication network comprises a core network and a mobile access network often also referred to as radio (access) network. A mobile terminal can communicate via the mobile access network and the core network with other mobile terminals or fixed terminals or application servers.

Mobile communication technologies have been growing fast in history, however, the path of the evolution has not followed a monolithic and homogeneous technology trend. Thus, nowadays many different mobile communication technologies exist that are incompatible or at least complex to use in parallel from a user perspective. This obstacle has been recently addressed by mobile communication providers by introducing handover technologies enabling a transfer of a mobile terminal's access between mobile access networks having different access technologies.

The 3GPP (3rd Generation Partnership Project) System Architecture Evolution enables a mobile terminal to connect to the EPC (Evolved Packet Core) network via different 3GPP and non-3GPP access technologies and to perform handover between different access technologies, as described in 3GPP TS (Technical Specification) 23.401 and TS 23.402.

One way to optimize handover between 3GPP mobile access networks, for example GERAN (GSM EDGE Radio Access Network; GSM (Global System for Mobile communications); EDGE (Enhanced Data Rates for GSM Evolution)), UTRAN (UMTS Terrestrial Radio Access Network; UMTS (Universal Mobile Telecommunications System)), E-UTRAN (Evolved-UTRAN, wherein the E-UTRAN will also be referred to as 'LTE'—Long Term Evolution—network hereinbelow) and WiMAX (Worldwide Interoperability for Microwave Access) access networks, has been proposed in 3GPP TSG SA WG2 Architecture, S2#61, S2-075215, 12-16 Nov. 2007, Ljubljana, Slovenia, BT et al. "Signalling flows for optimized handover between mobile WiMAX and 3GPP access (TS 23.402)", Agenda Item: 8.4.3.2, SAE/Rel-8 and in 3GPP TSG SA WG2 Architecture, S2#61, S2-075605, 12-16 Nov. 2007, revision of S2-075214, Ljubljana, Slovenia, BT et al., "Architecture for Optimized Handovers between mobile WiMAX access and 3GPP access (TS 23.402)", Agenda Item 8.4.3.2, SAE/Rel-8, which are incorporated by reference herein.

According to the above-mentioned documents, a new handover entity named Forward Attachment Function (FAF) is introduced. Generally, a FAF enables interworking for preparation of handover (in both directions) between WiMAX and 3GPP mobile access networks. A FAF acts as an E-UTRAN eNB towards the 3GPP EPC and RANs, acts as a WiMAX ASN towards WiMAX access networks (using WiMAX as an example for non-3GPP networks), and signals with the UE.

FIG. 1 exemplarily illustrates a FAF 100 interworking with 3GPP RANs (Radio Access Networks) 102 and a WiMAX access network 104 standing exemplarily for a non-3GPP access network. The FAF 100 connects via the S301 (also denoted as S1-MME) interface to the MME (Mobility Management Entity) of the EPC network in turn connected to the 3GPP mobile access networks GERAN, UTRAN, and E-UTRAN 102. Further, the FAF 100 is connected via the X101 interface to the WiMAX ASN (Access Service Network) of the WiMAX mobile access network 104. The FAF 100 acts as an E-UTRAN eNB (evolved Node B) towards the 3GPP EPC and RANs 102 over the S301 interface and as a WiMAX ASN towards WiMAX access network 104 over the X101 interface. The FAF 100 is further connected to a mobile terminal (UE 106) over the X200 (also denoted as LTE RRC) interface, e.g. via an IPsec (Internet Protocol security) tunnel T1 or T2.

When the UE 106 is using WiMAX access and intends to handover to one of the 3GPP-RANs 102, it performs a pre-attachment via the X200 reference point and the FAF 100 to the EPC nodes MME, SGSN (Serving GPRS Support Node (GPRS (General Packet Radio Service)), Serving GW (Serving Gateway), and PDN GW (Packet Data Network Gateway), as if it was attached via an E-UTRAN, wherein the FAF 100 mimicks an eNB. This enables that the handover can be optimized (i.e. accelerated), as context related to the usage of 3GPP access networks for the UE 106 is already established in the EPC nodes.

In the other direction, when the UE 106 is connected to GERAN, UTRAN or E-UTRAN 102 and intends to handover to WiMAX 104, the UE 106 can via the FAF 100 and via the X200 and X101 reference points already reserve resources in the WiMAX network 104.

The above-referenced documents do not solve the problem of how a UE may discover a FAF in a situation of a possible handover between 3GPP access network and non-3GPP access network. Consider for example the case of a possible handover to WiMAX. In this case it is desirable that the UE does only connect to the FAF when a handover to WiMAX is in fact feasible, i.e. when for example the UE is within the coverage of a WiMAX cell and/or the WiMAX access has high priority according to the access network selection policies of the UE, etc. In case a handover is not feasible, too much signaling occurs and state would be established unnecessarily in the FAF for the UE.

It is known to provide neighbour cell information in 3GPP access radio cells for neighbouring 3GPP cells, but not for neighbouring or overlapping non-3GPP cells. One way to address the problems above would be to extend 3GPP RAN information provisioning mechanisms to UEs such that the base stations/radio network controllers can provide neighbour cell information about neighbouring non-3GPP access cells (e.g. WiMAX) to the UEs, so that the UE knows when to connect to the FAF. However, this would require modifications to the 3GPP access networks and would lead to an increasing transmission overhead due to the new neighbour cell information.

A similar problem occurs in the complementary case of a possible handover to a 3GPP access network from a non-3GPP access network. For an optimized handover, the setup of a connection to the FAF—while the UE is connected to, e.g., WiMAX—would require that "suspended" 3GPP bearers are established in the evolved 3GPP core network for all active data sessions; when the WiMAX-to-3GPP-access handover occurs the data sessions active via WiMAX are then redirected to the already established "suspended" 3GPP bearers. The setup of the "suspended" 3GPP bearers requires signaling between 3GPP core network entities such as, e.g., the FAF, MME, Serving GW, PDG GW, HSS (Home Subscriber Server), as well as the usage of system resources in the core network nodes for maintaining the corresponding 3GPP bearer states. It is therefore desirable that the connection between the UE and the FAF as well as the subsequent core network signaling and bearer establishment/maintenance is only triggered when a WiMAX-to-3GPP-access handover is imminent.

The S2-075625 document only mentions that the UE may discover neighbour 3GPP cells while operating on mobile WiMAX access, and that this may be achieved with background scanning (e.g. when the UE has a dual-receive configuration) or by receiving the neighbour cell information from the network, e.g. via a user-plane mechanism or via a cell broadcast mechanism. However such an implementation would come along with the problems already discussed above.

SUMMARY

There is a demand for a technique for optimizing efficiency in a situation for a possible handover between mobile access networks based on different mobile access technologies, in particular between 3GPP access networks and non-3GPP networks.

This demand is satisfied by a first method for optimizing efficiency in a situation for a possible hand-over of a mobile terminal from a first mobile access network according to a first mobile access technology to a second mobile access network according to a second mobile access technology different from the first mobile access technology. The method is performed by a mobile terminal and comprises the steps of receiving information regarding an availability of at least one of the first mobile access network and the second mobile access network, in response to the reception of the received information, taking a decision regarding a connection to an inter-technology interworking entity, said entity being adapted to interwork between the first access technology and the second access technology, and, based on the decision, establishing a connection to the inter-technology interworking entity for a preparation of the handover or disconnecting from the inter-technology interworking entity for terminating a hand-over preparation.

The decision regarding a connection to the interworking entity may comprise to disconnect from the interworking entity in case of an already existing connection. Alternatively, a connection may not exist and may be established following the decision.

The handover preparation phase may comprise one or more steps after a decision to consider a handover from the first to the second mobile access network is made, i.e. after a positive decision regarding a connection to the interworking entity has been made. The handover preparation phase may extend to a point in time when an actual decision for a handover to the second network is taken and the hand-over is initiated and performed.

A handover preparation phase may start with a decision regarding the connection to the interworking entity, or a decision routine related to a handover to the second mobile access network for which a connection to the interworking entity needs to be established. The handover preparation phase may end with the decision to actually initiate the handover or with the decision to not consider the second mobile access network for handover.

The above-discussed method may further comprise the step of sending information from the mobile terminal to the inter-technology interworking entity via the established connection for initiating the handover of the mobile terminal from the first mobile access network to the second mobile access network. According to some implementations, the method may comprise the step of connecting to the second mobile access network in response to the initiation of the hand-over.

Some realizations of the method comprise the step of disconnecting from the first mobile access network in response to the initiation of the hand-over. For example, single radio terminals must be disconnected from the first mobile access network, while multi-radio mobile terminals may stay connected or may get disconnected.

The method discussed here may comprise the step of determining an address of the inter-technology interworking entity. In this case, the method the address of the inter-technology interworking entity may be determined by the mobile terminal from a database of the mobile terminal or from a database accessible via the first mobile access network.

Multiple inter-technology interworking entities may exist and the received information regarding an availability may be indicative for the inter-technology interworking entity of the multiple inter-technology interworking entities for which the decision regarding the connection is to be taken. For example, the interworking entity closest to the mobile terminal may be indicated, or an interworking entity which has the lowest load. Other optimization criteria may also be applied for selection and indication of a specific interworking entity of multiple interworking entities.

The mobile terminal may analyse the received information regarding the availability for the decision regarding the connection. Additionally or alternatively, the mobile terminal may take a further decision for initiating the handover after the connection to the inter-technology interworking entity has been established.

In one implementation of the method, for taking the decision regarding the connection and/or the further decision for initiating the handover, at least one of the following criteria is assessed: connection probability and service related criteria. With regard to the connection probability, for example the mobile terminal may scan the first and/or the second mobile access network for proper reception quality as a basis for the decision whether to initiate handover to the second mobile access network or not to initiate the handover and to stay with the first mobile access network. With regard to the service related criteria, the service, e.g. voice call, data transfer, Mobile TV, etc., may have an impact on the decision whether or not to handover. For example, if the service may benefit in terms of quality of service or latency from a handover, the handover initiation may be prioritized. Other criteria may be assessed also for the decisions.

The above-defined demand is also satisfied by a second method for optimizing efficiency in a situation for a possible hand-over of a mobile terminal from a first mobile access network according to a first mobile access technology to a second mobile access network according to a second mobile access technology different from the first mobile access technology. The method is performed by at least one entity in the first mobile access network and comprises the step of sending information regarding an availability of at least one of the first mobile access network and the second mobile access network.

The second method may further comprise the steps of receiving an instruction from an inter-technology interworking entity to disconnect the mobile terminal from the first mobile access network, and disconnecting the mobile terminal from the first mobile access network, for example in case the handover requires a disconnection from the first mobile access network.

For both the first and the second method outlined above, the mobile terminal may be a User Equipment adapted for connecting to at least one 3GPP radio access network and at least one non-3GPP radio access network. One implementation of the inter-technology interworking entity may be the FAF described further above.

The first mobile access network may be a 3GPP access network, and the second mobile access network may be a non-3GPP access network, e.g. a WiMAX network. Alternatively, the first mobile access network may be a non-3GPP access network, and the second mobile access network may be a 3GPP access network. The first mobile access technology may be defined according to a first standard and the second mobile access technology may be defined by a second standard and the first standard being different from the second standard. The inter-technology interworking entity may be then denoted as inter-technology inter-standard interworking entity. As an example, the first standard may be a 3GPP standard, while the second standard may be a non-3GPP standard.

For both of the above-discussed methods, the information regarding an availability of at least one of the first mobile access network and the second mobile access network may be provided to the mobile terminal whenever and/or wherever the availability changes. Regarding the aspect of "whenever", the availability change may comprise in a timely sense that an availability of at least one of the first and second mobile access network changes at a particular point in time. For example, one of the networks may be switched on at a certain point in time.

Regarding the aspect of "wherever", additionally or alternatively the event of availability change may comprise in a geographical sense that an availability of at least one of the first and second mobile access network changes at or with a particular location. For example, the mobile terminal may move from a location where one of the two mobile access networks is not available to a location where both networks are available.

Although herein in some places the term "whenever" may only be used, it is to be understood that this may also include the meaning of the term "wherever" as discussed above. In still further implementations, a change in availability may additionally or alternatively comprise a change in a quality of service, transmission, etc. provided by a network, and/or may comprise a status change related to network resources, congestion conditions, feasibility, etc.

The information regarding the availability may be communicated to the mobile terminal via a connection between the mobile terminal and the first mobile access network, wherein "communicated" is to be understood as "sent" from the perspective of the first mobile access network and "received" from the perspective of the mobile terminal.

The information regarding the availability of the first mobile access network may comprise an identity related to a predefined structural element of the first mobile access network. For example, the predefined structural element may be a cell and the identity may be a cell ID of a cell of an UTRAN or WiMAX network. Additionally or alternatively, the information regarding the availability of the second mobile access network may comprise an identity related to a predefined structural element of the first mobile access network.

According to one variant of the invention, the information regarding the availability of at least one of the first mobile access network and the second mobile access network comprises an indication of a reserved value, wherein the reserved value is reserved in the first mobile access network for indicating the availability of the second mobile access network, e.g. a reserved UTRAN or WiMAX cell ID. This variant of the method may comprise the step of determining that the received information comprises a reserved value, and may still further comprise the step of determining that the reserved value indicates an availability of the second mobile access network.

The mobile terminal may be adapted to immediately conclude from the predefinition of the structural element to the availability of the first resp. second mobile access network. The mobile terminal may be adapted to recognize from the predefinition that the received identity indicates, e.g., a cell at the coverage edge of the resp. mobile access network, from which the mobile terminal can conclude to the resp. availability. For example, in case the mobile terminal is currently served by the first mobile access network, it may conclude from a received cell ID of a cell of the second mobile access network that the mobile terminal is located at the coverage edge of the second mobile access network to which a handover may be desirable, e.g. because of possibility of loss of connection to the first mobile network or because the second mobile access network provides better coverage or data rates or service, etc.

The information regarding the availability of the second mobile access network may indicate that a connection to the second mobile access network is or will become feasible. For example, the status of availability of the second mobile access network may change from "not available" to "available" or to "likely to be available".

Additionally or alternatively, the information regarding the availability of the first mobile access network may indicate that a connection to the first mobile access network will no longer be feasible. For example, the status of the availability of the first mobile access network may change from "available" to "not available" or "likely not available anymore", because the mobile terminal is at the edge of the coverage area of the first mobile access network or the first mobile access network is or may get soon congested.

The above-mentioned demand is further satisfied by a mobile terminal applicable in a situation of a possible handover of a mobile terminal from a first mobile access network according to a first mobile access technology to a second mobile access network according to a second mobile access technology different from the first mobile access technology. The mobile terminal is adapted to receive information regarding an availability of at least one of the first mobile access network and the second mobile access network, to take in response to the reception of the received information a decision regarding a connection to an inter-technology interworking entity, said entity being adapted to interwork between the first access technology and the second access technology, and, based on the decision, to establish a connection to the inter-technology interworking entity for a preparation of the hand-over or disconnecting from the inter-technology interworking entity for terminating a hand-over preparation.

The mobile terminal may be adapted to perform the steps of the corresponding method implementations as outlined above. The mobile terminal may comprise a receiving unit for receiving messages, a transmission unit for sending messages, and a processing unit for processing messages and information, e.g. for taking decisions.

It may also comprise further units like an input unit (e.g. a keypad), an output unit (e.g. a display), and a storage unit for storing and retrieving information. The respective units may be adapted to perform the steps mentioned before as far as related to the mobile terminal, e.g. sending messages and establishing the connection to the interworking entity by the transmission unit, receiving messages, e.g. the information regarding the availability by the receiving unit, taking decisions or performing analysis by the processing unit, etc.

The above-mentioned demand is still further satisfied by an entity of a first mobile access network applicable in a situation for a possible hand-over of the mobile terminal from a first mobile access network according to a first mobile access technology to a second mobile access network according to a second mobile access technology different from the first mobile access technology. The entity is adapted to send information regarding an availability of at least one of the first mobile access network and the second mobile access network.

The entity may be adapted to perform the steps of the corresponding method implementations outlined above. The entity may be an eNB in an LTE (Long Term Evolution network), an RNC in an UMTS network, or a WiMAX base station or similar node in a WiMAX network.

The entity may comprise a transmission unit for sending messages, a receiving unit for obtaining the information regarding the availability, and a processing unit that triggers the sending of at least one message comprising the information regarding the availability of at least one of the first mobile access network and the second mobile access network.

Still further, the above-mentioned demand is satisfied by a computer program comprising portions of software codes in order to implement the steps of any of the methods outlined above when operated on a mobile terminal and/or when operated on an inter-technology interworking entity.

BRIEF DESCRIPTION OF THE DRAWINGS

In the following, the invention will further be described with reference to exemplary embodiments illustrated in the figures, in which.

DETAILED DESCRIPTION

Figure 1:
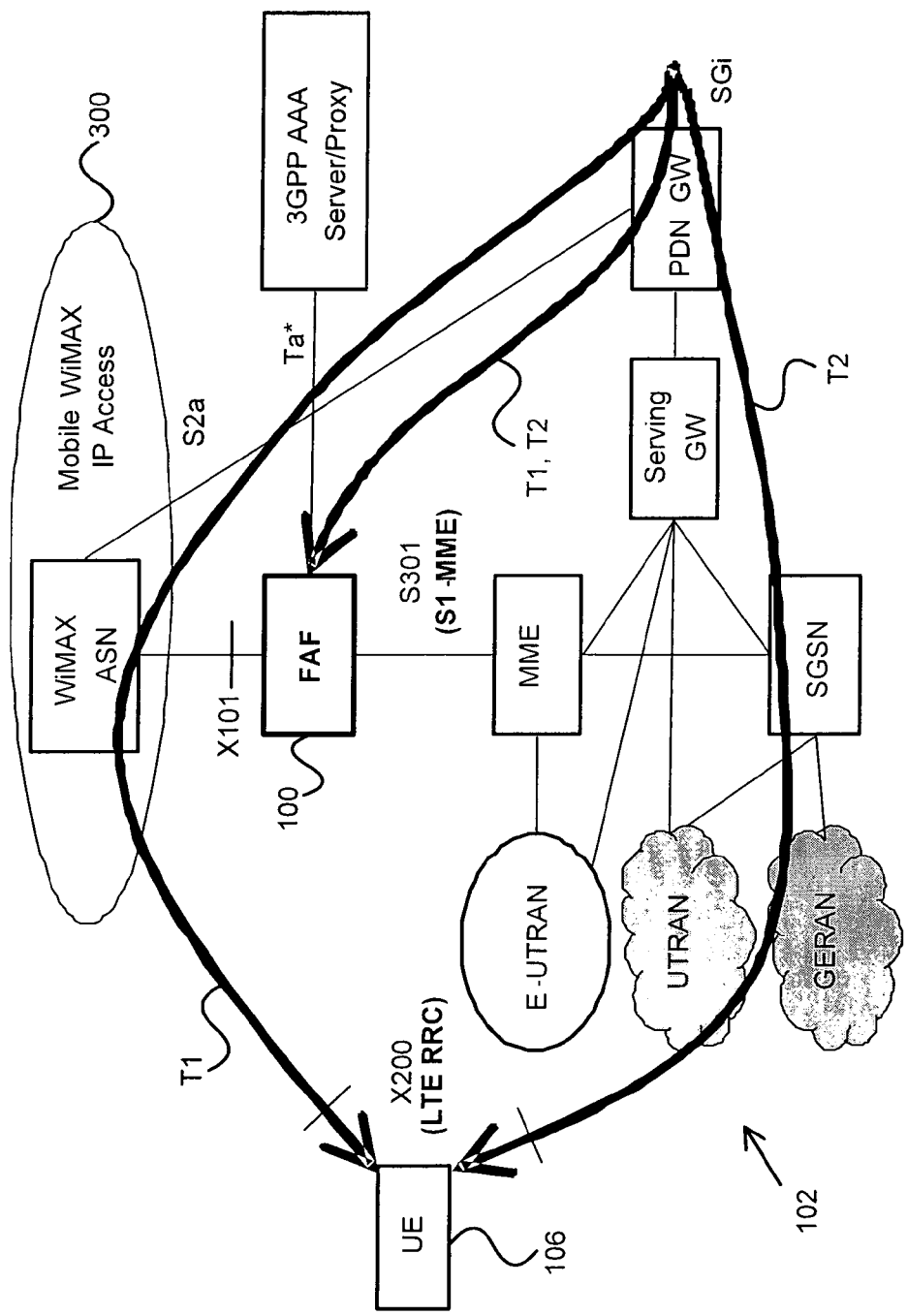
FIG. 1 schematically illustrates an exemplary network scenario including a 3GPP network, a WiMAX network and a FAF.

In the following description, for purposes of explanation and not limitation, specific details are set forth, such as a network scenario including a 3GPP network and a non-3GPP network implemented as a WiMAX network in order to provide a thorough understanding of the current invention. It will be apparent to one skilled in the art that the current invention may be practiced in embodiments that depart from these specific aspects. For example, the skilled artisan will appreciate that the current invention is applicable for handovers between any kind of mobile access networks of different technologies resp. different standards, and may be practised in other interworking scenarios including other types of access networks, in which case a FAF or similar inter-network interworking entity provides for an interworking between these access networks. Generally, handover scenarios between any kind of non-3GPP/3GPP2 (3rd Generation Partnership Project 2) RAN and any kind of 3GPP/3GPP2 RANs may be optimized by the inventive techniques. For example, the invention is applicable for scenarios in which a non-3GPP2 RAN such as a WiMAX, but also WLAN or other network is interworking with 3GPP2 RANs like CDMA2000, UMB (Ultra Mobile Broadband) or even different types of non-3GPP/3GPP2 access networks (herein, the term "3GPP" is generally to be understood as "3GPP/3GPP2", i.e. as comprising 3GPP2).

While in the scenarios described below a 3GPP/3GPP2 aware User Equipment is often used as an exemplary implementation of a mobile terminal, it is to be understood that such terminal may be implemented in many different ways. For example, the mobile terminal may be implemented as a notebook or even a stationary computer such as a personal computer (PC) with a 3GPP/3GPP2 card and a WiMAX card inserted.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to the processor, wherein the memory is encoded with one or more programs that perform the methods disclosed herein when executed by the processor.

The invention will be described below with reference to the exemplary network scenario illustrated in FIG. 1 which has been introduced already further above. In case the UE 106 is served by one of the 3GPP access networks 102, the UE 106 is provided with availability information regarding the availability of the non-3GPP (WiMAX) access network 104 without the need to modify the 3GPP RAN access network 102, as will be described in detail below. In case, on the other hand, the UE 106 is served by the WiMAX access network 104, the UE 106 is provided with availability information regarding the 3GPP RAN access network 102 and/or an indication of change of availability of the non-3GPP (WiMAX) access network 104 without the need to modify, e.g., the framework of providing neighbour cell information as established for WiMAX access networks. Further, in case several inter-technology interworking entities such as the FAF 100 are available, mechanisms are proposed further below in order that a FAF may be discovered which is best suited for the UE 106, e.g., because it is nearest to the UE 106.

Figure 2:
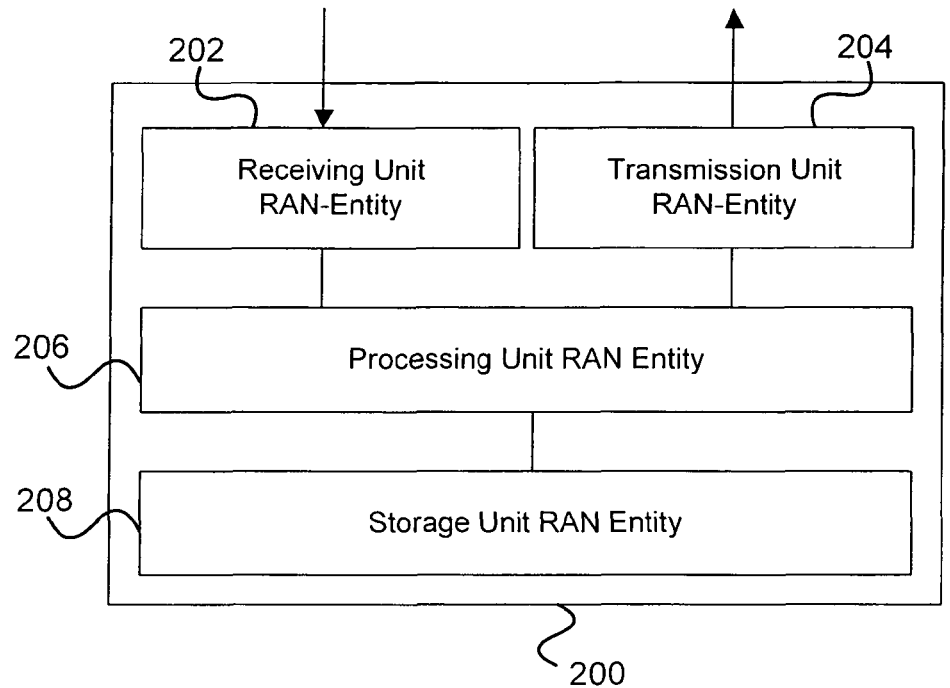
FIG. 2 illustrates functional components of an entity of a first mobile access network.

FIG. 2 schematically illustrates functional building blocks of an entity 200 of a first mobile access network such as a 3GPP or non-3GPP mobile access network. One implementation of the entity 200 may, for example, be a node B of the UTRAN or an eNB of the E-UTRAN access network 102 of the 3GPP network of FIG. 1. Another possible implementation of the entity 200 is a base station in the WIMAX access network 104.

The entity 200 comprises a receiving unit 202, a transmission unit 204, a processing unit 206 and a storage unit 208. The receiving unit 202 is adapted for obtaining information regarding an availability of one or more mobile access networks separate from the access network the entity 200 is associated with. The processing unit 206 is adapted to trigger the sending of at least one message comprising information regarding the availability of at least one of the mobile access networks the entity 200 is associated with and the separate mobile access network(s). The sending of the information may for example be triggered by a determination that the availability of one of the networks has changed for one or more of mobile terminals served by the mobile access network the entity 200 is associated with.

In another embodiment, no status determination of mobile terminals is performed. For example, the information may be send in system information that is broadcasted within a radio cell and is thus received by any mobile terminal within the radio cell. Specific radio cells may transmit this information independent of individual mobile terminals, for example cells of a specific geographic area may be configured to indicate an availability change of the 1st/2nd mobile network coverage. Examples for such areas are the common coverage area 602 in FIG. 6 or the coverage edge area 802 in FIG. 8, which will be discussed below.

The transmission unit 204 is adapted to send the messages triggered by the processing unit 206. The storage unit 208 is adapted to store the obtained information, the availability information and/or further information related thereto.

Figure 3:
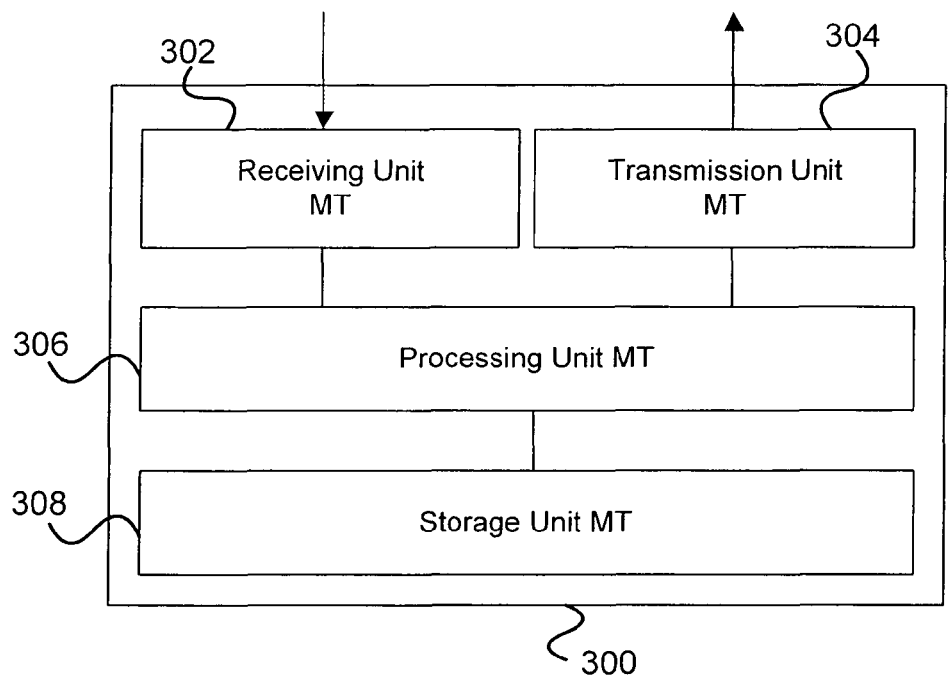
FIG. 3 illustrates functional components of a mobile terminal.

FIG. 3 schematically illustrates functional building blocks of a mobile terminal 300 enabled for an optimized handover preparation procedure according to one or more of the techniques described herein. One implementation of the mobile terminal 300 is the UE 106 of FIG. 1.

The mobile terminal 300 comprises a receiving unit 302, a transmission unit 304, a processing unit 306 and a storage unit 308. The receiving unit 302 is adapted to receive messages comprising availability information related to at least one of the mobile access network currently serving the mobile terminal 300 and separate mobile access network(s). The processing unit 306 is adapted to take a decision regarding a connection to an inter-technology interworking entity such as the FAF 100 depicted in FIG. 1 in response to the reception of the availability information. The processing unit 306 is further adapted to trigger, based on the decision, establishment of a connection to the inter-technology interworking entity either for a preparation of a handover or for disconnecting from the interworking entity in order to in this way terminate a handover preparation phase.

The transmission unit 304 is adapted to establish the aforementioned connection to the interworking entity. The storage unit 308 is adapted to store the received availability information and/or related information.

Figure 4:
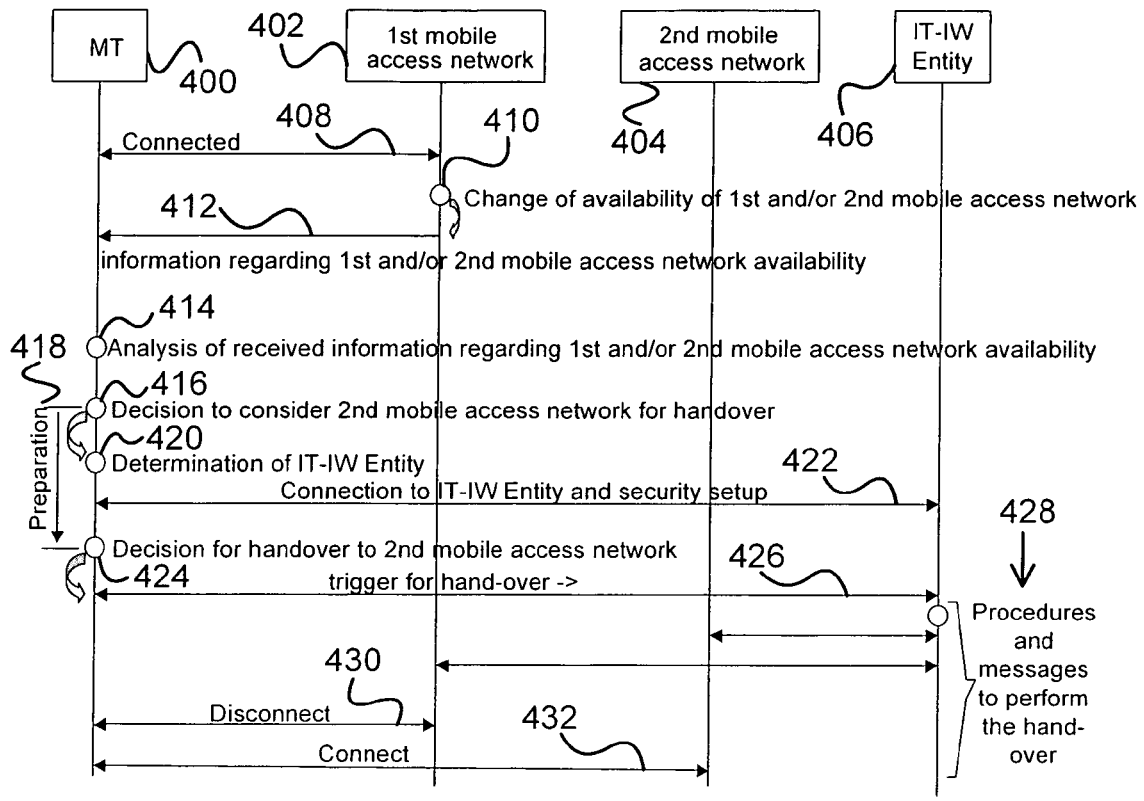
FIG. 4 is a sequence diagram illustrating a first embodiment of a message sequence taking place in a network scenario.

FIG. 4 is a sequence diagram illustrating an exemplary message exchange between the entities illustrated in FIGS. 2 and 3 in a generic network scenario. A mobile terminal 400 may be an implementation of the mobile terminal 300 of FIG. 3 or of the UE 106 of FIG. 1. An implementation of an inter-technology interworking entity 406 may be the FAF 100 of FIG. 1. An implementation of a first mobile access network 402 may be one of the 3GPP networks 102. An implementation of a second mobile access network 404 may be the non-3GPP network 104 in FIG. 1. According to a different embodiment, an implementation of the first mobile access network 402 is the non-3GPP network 104 of FIG. 1 and an implementation of the second mobile access network 404 is one of the 3GPP networks 102 of FIG. 1.

In step 408, the mobile terminal 400 is connected to the first mobile access network 402. In step 410, a change of availability of at least one of the first and second mobile access networks 402 and 404 occurs. For example, the mobile terminal 400 may enter an area covered by both the networks 402 and 404. Triggered by the change of availability, in step 412 the network 402 provides information regarding the availability of the first and/or the second mobile access network to the mobile terminal 400. An entity of the first mobile access network 402 such as e.g. entity 200 may detect the availability change and signal it to the mobile terminal 400. In some embodiments, the provisioning of availability information regarding an availability change is configured via network management. As an example, in case a network structure is changed, radio cells of a specific geographic area related to the changed structure may be configured to send out corresponding availability information.

In response to the reception of the availability information, in step 414 the mobile terminal 400 analyses the received information and decides in step 416 to consider a handover to the second mobile access network 404. With step 416 a preparation phase 418 for a possible handover to network 404 starts.

Following the decision 416, in step 420 the mobile terminal 400 determines an interworking entity to connect to. In step 422, a connection to the determined entity 406 is set up. The step 422 may also comprise that information is provided by the interworking entity 406 to the mobile terminal 400. Security information may be exchanged. In step 424 the mobile terminal 400 takes a decision for a handover to the second mobile access network 404. Following this decision, in step 426 the mobile terminal 400 provides a trigger for handover to the interworking entity 406. On reception of the trigger, the interworking entity 406 runs in step 428 various procedures to perform the handover of the mobile terminal 400 from network 402 to network 404. As a result, the mobile terminal 400 disconnects in step 430 from the first mobile access network 402 and connects in step 432 to the second mobile access network 404.

The change of availability in step 410 may be due to a change in location of the mobile terminal 400 and/or time. With regard to the location change, the terminal may move from an area covered only by network 402 to an area covered by both networks 402 and 404. In this scenario, the network 402 may permanently provide the availability information related to network 404, e.g. in the common coverage area. As examples for an availability change in time, the network 404 may be switched on at the time point 410, or some status or parameter related to network 404 may change at that time, for example a better QoS may be available to mobile terminal 400.

Figure 5:
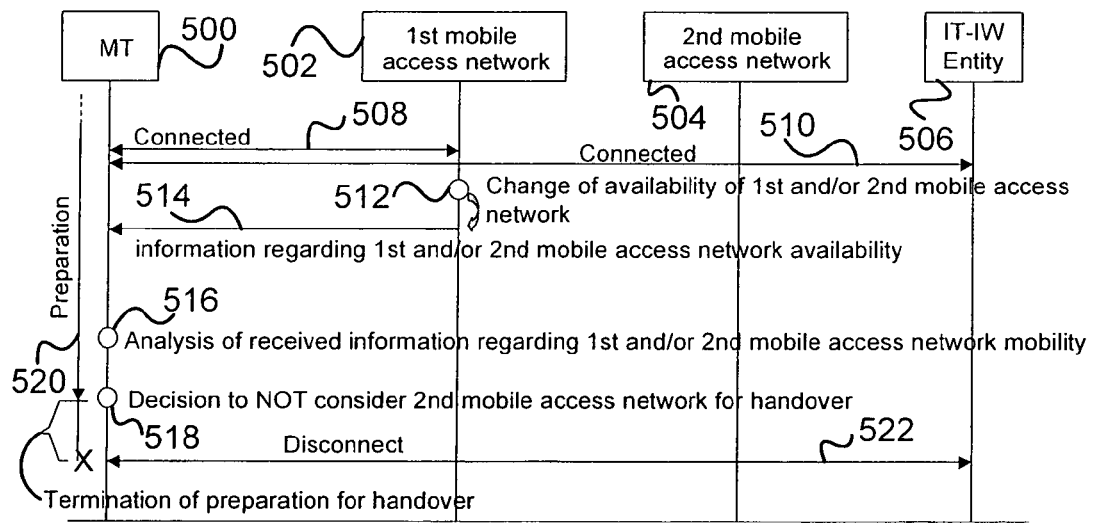
FIG. 5 is a sequence diagram illustrating a second embodiment of a message sequence taking place in a network scenario.

FIG. 5 shows a further exemplary message sequence as it may be performed in a generic network scenario comprising a mobile terminal 500, a first mobile access network 502, a second mobile access network 504 and an inter-technology interworking entity 506. The terminal 500 and entity 506 may or may not be identical to the terminal 400 and entity 406 of FIG. 4, and the mobile access networks 502 and 504 may or may not be identical to the networks 402 and 404 of FIG. 4.

In step 508, the mobile terminal 500 is connected to the network 502. In step 510, the mobile terminal 500 is connected to the interworking entity 506, wherein the connection may be established in a similar way as described with reference to steps 410 to 422 in FIG. 4. In step 512, an availability of one or both of networks 502 and 504 changes. The considerations above for step 410 in FIG. 4 can similarly be applied to step 512. In step 514, the first mobile access network 502 provides information regarding the availability of one or both of the networks 502 and 504 to the mobile terminal 500. In step 516, the received availability information is analysed by the mobile terminal 500. In step 518 the mobile terminal 500 takes a decision not to consider a handover to the second mobile access network 504. Thus, the preparation phase 520 for a possible handover to network 504 terminates with step 522 of disconnecting from the interworking entity 506.

Figure 6:
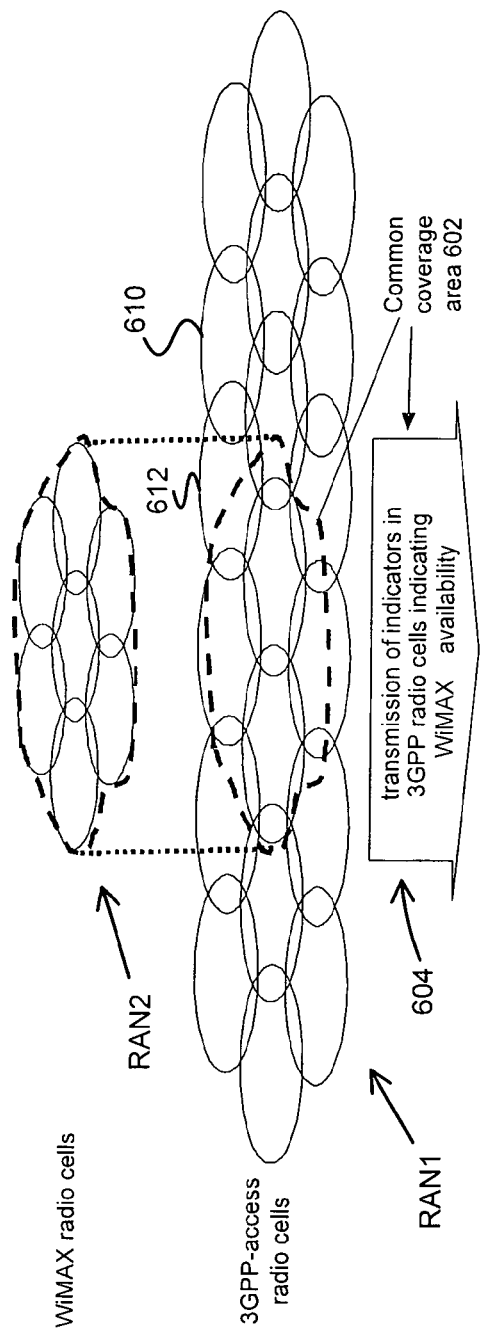
FIG. 6 schematically illustrates a coverage overlap of cells of the 3GPP network and cells of the non-3GPP network from the point of view of the 3GPP network.

FIG. 6 schematically illustrates a situation of overlap in coverage of a 3GPP RAN "RAN1" and a non-3GPP access network "RAN2". For illustration it is assumed in the following that RAN1 belongs to one of the 3GPP radio access networks 104 while RAN2 belongs to the WiMAX access network 104 of FIG. 1. The overlapping or common coverage area 602 is illustrated by the dashed lines in FIG. 6.

Assuming that the mobile terminal 106 of FIG. 1 is currently served by the 3GPP access RAN1, arrow 604 illustrates that RAN1 operates to provide information to the UE 106 indicating an availability of the WiMAX RAN2. The availability information may be provided permanently, or may be provided when an availability of RAN2 changes, for example due to a change in services offered to mobile terminal 106. The corresponding availability information may be provided in those 3GPP radio cells of RAN1 which have at least in part a geographic coverage area in common with one or more of the WiMAX radio cells of RAN2 604. For example, cell 610 of RAN1 may not provide availability information regarding RAN2 to mobile terminals located therein, while cell 612 of RAN1 may provide availability information regarding RAN2 to mobile terminals located within the coverage area of cell 612. In other embodiments, also cells not actually covered by coverage area 602 may nevertheless provide availability information regarding availability of RAN2. For example, cell 612 may provide availability information as it is a neighbouring cell to cell 610 which is covered in part by coverage area 602.

The transmission 604 of the availability information may comprise system information messages, for example broadcast messages, and/or dedicated signalling messages directed towards one or more specific mobile terminals. The availability information provided by RAN1 may conform to a conventionally known, standardized prescription as defined for 3GPP RANs for other information. For example, the availability information may conform to the prescriptions for a provisioning of 3GPP RAN neighbour cell information, and/or may conform to the prescriptions for a provisioning of tracking area identifiers, routing area identifiers or location areas identifiers.

The availability information may comprise reserved values, i.e. certain values of cell identifiers, location area identifiers, etc. which are allowed according to the 3GPP prescriptions but which are reserved for indicating an availability of non-3GPP access networks. The reserved values may be specified in the corresponding 3GPP standards. Additionally or alternatively, the reserved values (and the meaning thereof) could be defined via network management which would include provisioning of the meaning of the so-defined reserved values to the mobile terminals.

As one example, an operator of the 3GPP network RAN1 may define the reserved values to be used. Further, the operator may configure which of the 3GPP RAN1 nodes (RNCs, eNBs, and/or BSSs) provide these reserved values to the UEs, for example the RAN1 nodes serving the RAN1 cells involved in the coverage area 602. The operator may use the Access Network Discovery and Selection Function (ANDSF, see TS 23.402) and/or the Media Independent Information Server (MIIS, see IEEE 802.21) for configuring the details of how reserved values are provisioned to the UEs. The ANDSF/MIIS policies enable also to provide the UEs with the meaning of the reserved values.

A reserved UTRAN cell ID, for example, may further indicate frequency band, bandwidth, version or type of the WiMAX RAN2, etc. Different reserved values may be used to indicate differently configured WiMAX access networks. More generally, for example different (sets of) reserved values may be used to indicate different non-3GPP access networks available, for example one set of reserved values may indicate WiMAX, another set IEEE 802.20 networks, IEEE 802.22 networks, WLAN networks, etc. The reserved information may also indicate available interworking entities such as one or more of a plurality of FAFs.

Figure 7:
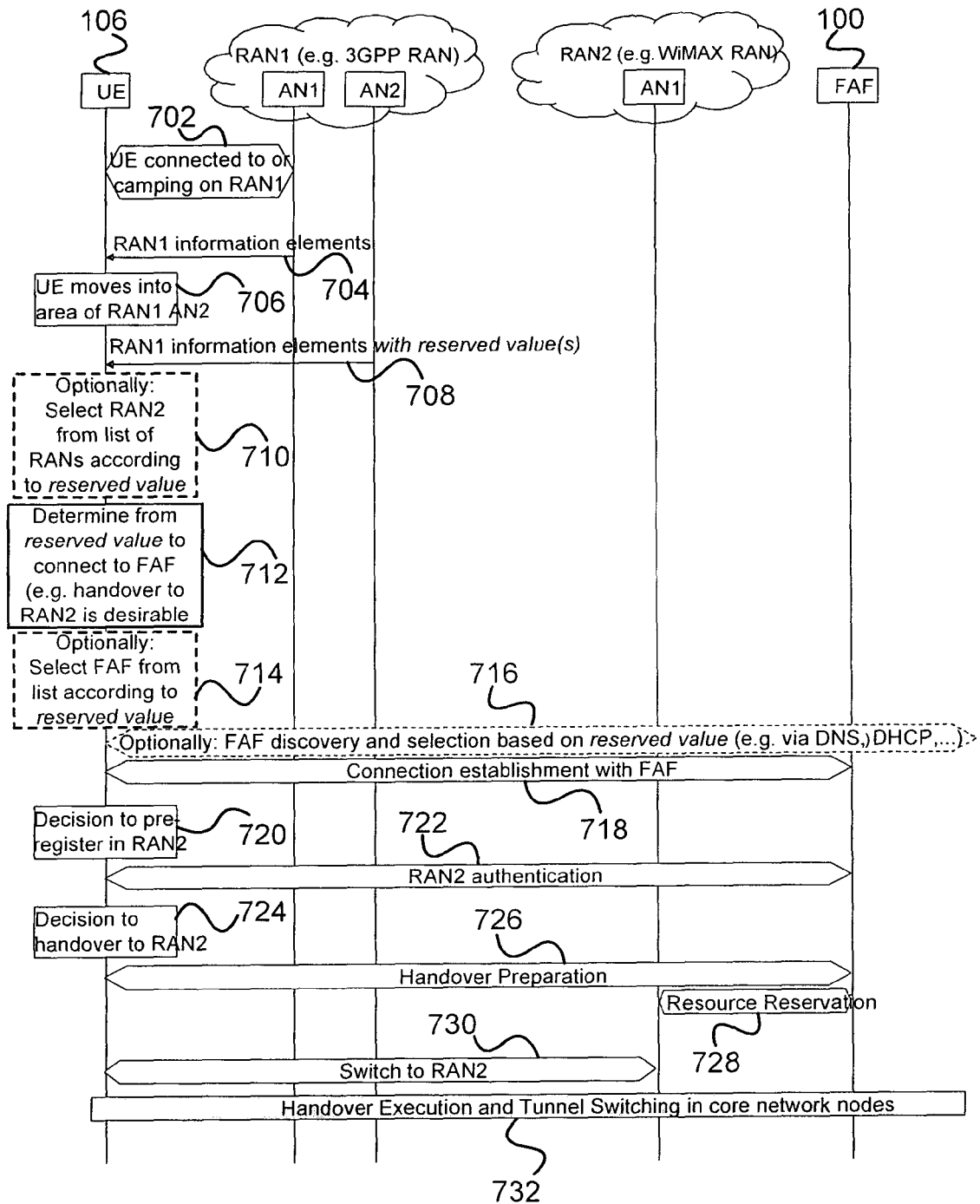
FIG. 7 schematically illustrates a procedure for preparing a handover from a 3GPP network to a non-3GPP network.

FIG. 7 illustrates an example procedure according to which a handover from the RAN1 to the RAN2 of FIG. 6 is performed, wherein it is additionally assumed that RAM. belongs to one of the 3GPP radio access networks 102 and RAN2 belongs to the WiMAX access network 104 of FIG. 1. Accordingly, involved in the procedure are the UE 106 and FAF 100 of FIG. 1 as well as access nodes AN1, AN2 in RAN1 (termed 'RAN1 AN1' and 'RAN1 AN2' for short below), which may be eNBs, for example. Further involved is an access node AN1 in RAN2 (termed 'RAN2 AN1' for short below), which may be a base station in the WiMAX access network 104.

In step 702 the UE 106 is served by RAN1, for example the UE 106 may be connected to RAN1 or may be camping on RAN1. Specifically the UE 106 is served by AN1 of RAN1. It is assumed that RAN1 AN1 does not have any coverage in common with RAN2, i.e., as long UE 106 is served by RAN1 AN1, it is the only access available for UE 106. Accordingly, the RAN1 information provided to the UE 106 in step 704, the information being assumed to comprise neighbour cell information in the form of broadcast information, may only comprise information related to neighbouring cells of RAN1.

In step 706, the UE 106 moves into an area of RAN1 served by access node AN2. It is assumed that RAN1 AN2 serves cells which have at least partially common coverage with RAN2. Exemplarily referring to FIG. 6, RAN1 AN2 may serve cell 612 which partly belongs to common coverage area 602. In step 708, the RAN1 AN2 broadcasts RAN1 neighbour cell information in the form of one or more 3GPP standard conformant information elements (IEs) to the UE 106. The IEs comprise availability information indicating an availability of RAN2. In particular, one or more reserved values of standard conformant cell identifiers (IDs) are included in the information. For example, the information provided in step 708 may comprise a list of RAN1 cell IDs indicating neighbouring RAN1 cells, and may further comprise, as availability information, a list of one or more specific RAN1 cell ID values, which are however reserved for indicating the availability of RAN2. Optionally, the broadcasted information may also comprise an indication of the interworking entity FAF 100 (cf. FIG. 1).

The RAN1 AN2 may permanently provide the availability information related to RAN2; for example the availability information may be embedded in information which is periodically broadcasted into the cell(s) served by RAN1 AN2. In other embodiments, the provisioning of the availability information may be triggered by particular events. For example, the availability information may only be provided by the RAN1 AN2 when the UE 106 moves to the RAN1 AN2 (i.e. when the availability of RAN2 changes from non-available to available from the perspective of the UE 106), e.g. when the UE 106 performs a RAN1 internal handover, as illustrated in step 706 in FIG. 7. Triggered by such event, the RAN1 AN2 may broadcast the availability information or, alternatively, the RAN1 AN2 may provide the availability information in the form of dedicated signalling to the UE 106. Combinations of periodically broadcasting the availability information and providing it to specific mobile terminals via dedicated messaging are also possible and may be configured in order to minimize a transmission overhead and at the same time ensure appropriate possibilities for the mobile terminals to connect to an available non-3GPP network.

In response to the reception of the availability information comprising reserved values in otherwise 3GPP standard conformant IEs in step 708, the UE 106 may perform the step of determining that reserved values have been received, and may further perform the step of determining from the received reserved values that a non-3GPP access network is likely to be available. The availability information received in step 708 may comprise an indication which enables the identification of RAN2 either directly or indirectly, i.e. by further processing the received information. For example, in response to the reception of the availability information in step 708, the UE 106 may optionally determine in step 710 the RAN2 from a list of RANs. Such list may for example be stored in the UE (e.g. in the storage unit 308 of mobile terminal 300 of FIG. 3), or may be accessible by the UE 106 via RAN1.

In step 712, the UE 106 decides, based on the received information, to connect to a FAF. The decision may be based on a variety of conditions. For example, a handover to RAN2 may appear desirable because achievable data rates may be higher, a better quality of service may be achievable, and/or WiMAX access is generally prioritized over 3GPP access, etc.

The UE 106 may decide in step 712 to connect to a particular FAF, for example because only a single FAF is available via RAN1 or only one particular FAF has been indicated in the availability information. In case the UE 106 has only decided to generally connect to a FAF in step 712, the UE 106 may then perform the optional step 714 of selecting a particular FAF out of multiple FAFs available via RAN1. For example, a list of FAF entities associated with RAN1 may be stored in the UE 106 or may otherwise be accessible for the UE 106. Additionally or alternatively, the UE 106 may perform the optional step 716 of discovering and/or selecting the FAF 100 via DNS lookup, DHCP, or other procedures.

In step 718 the UE 106 establishes connection with FAF 100, e.g. via an IPsec tunnel such as tunnel T2 illustrated in FIG. 1. The step 718 may comprise that the FAF 100 provides additional information regarding RAN2 to the UE 106. Based on the information received in one or more of the steps 708 to 714, in step 720 the UE 106 decides to pre-register with RAN2. Thus, in step 722 the UE 106 authenticates via the FAF 100 with RAN2 or the WiMAX network 104 the RAN2 belongs to. In step 724 the UE 106 decides to perform a handover to RAN2. Additional conditions may or may not have to be fulfilled over that discussed above with regard to step 712. For example, an additional condition may be that a performance of a connection to RAN1 falls below a threshold.

In step 726, the UE 106 communicates with FAF 100 in order to trigger handover preparation. Correspondingly, in step 728 the FAF 100 acts as a WiMAX base station towards the WiMAX RAN2 and operates to reserve resources in order to in this way optimize the imminent handover of the UE 106. In step 730, the UE 106 switches to RAN2. While not shown in FIG. 7, this may comprise disconnecting from the RAN1. In step 732, the handover is executed. The details of the operation of FAF 100 in steps 726, 728 and 732 is described in the S2-075215 and S2-075605 documents referenced in detail above.

Figure 8:
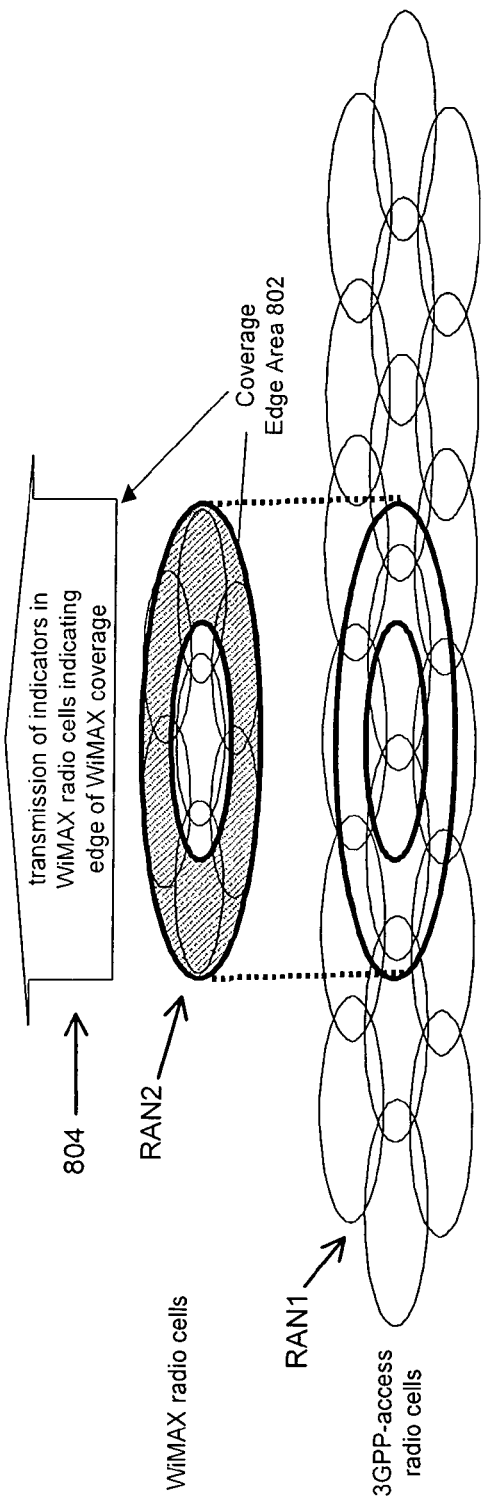
FIG. 8 schematically illustrates a coverage overlap of cells of a 3GPP network and cells of a non-3GPP network from the point of view of the non-3GPP network.

FIG. 8 schematically illustrates a situation of overlap in coverage of the RAN1 and RAN2 introduced already with reference to FIG. 6, however from the perspective of the WiMAX access network RAN2. A coverage edge area 802 of RAN2 is formed by those WiMAX radio cells forming the edge of RAN2. Mobile terminals served by RAN2 cells of the coverage edge area 802 may receive a transmission 804 of availability information which indicates the edge of the WIMAX coverage and the availability of the 3GPP RAN1. The transmission 804 may be performed permanently or when an availability of RAN1 changes.

The information provided in step 804 may be embedded in procedures conventionally known from the WiMAX access technology, for example with regard to the announcement of neighbouring RAN2 cells or paging areas. The availability information regarding the availability of RAN1 may be encoded as one or more reserved values in IEs, for example, the availability information may be encoded as a reserved WiMAX cell ID. No reserved values need to be standardized, but the reserved values might be defined purely by network management. The operator may specify particular reserved values and may additionally configure which WiMAX nodes provide the reserved values to the mobile terminals. For example, the WiMAX nodes serving the cells of the coverage edge area 802 may be configured correspondingly. Additionally or alternatively, the operator may configure ANDSF/MIIS policies such that the mobile terminals are provided with the reserved values and the meaning thereof.

Figure 9:
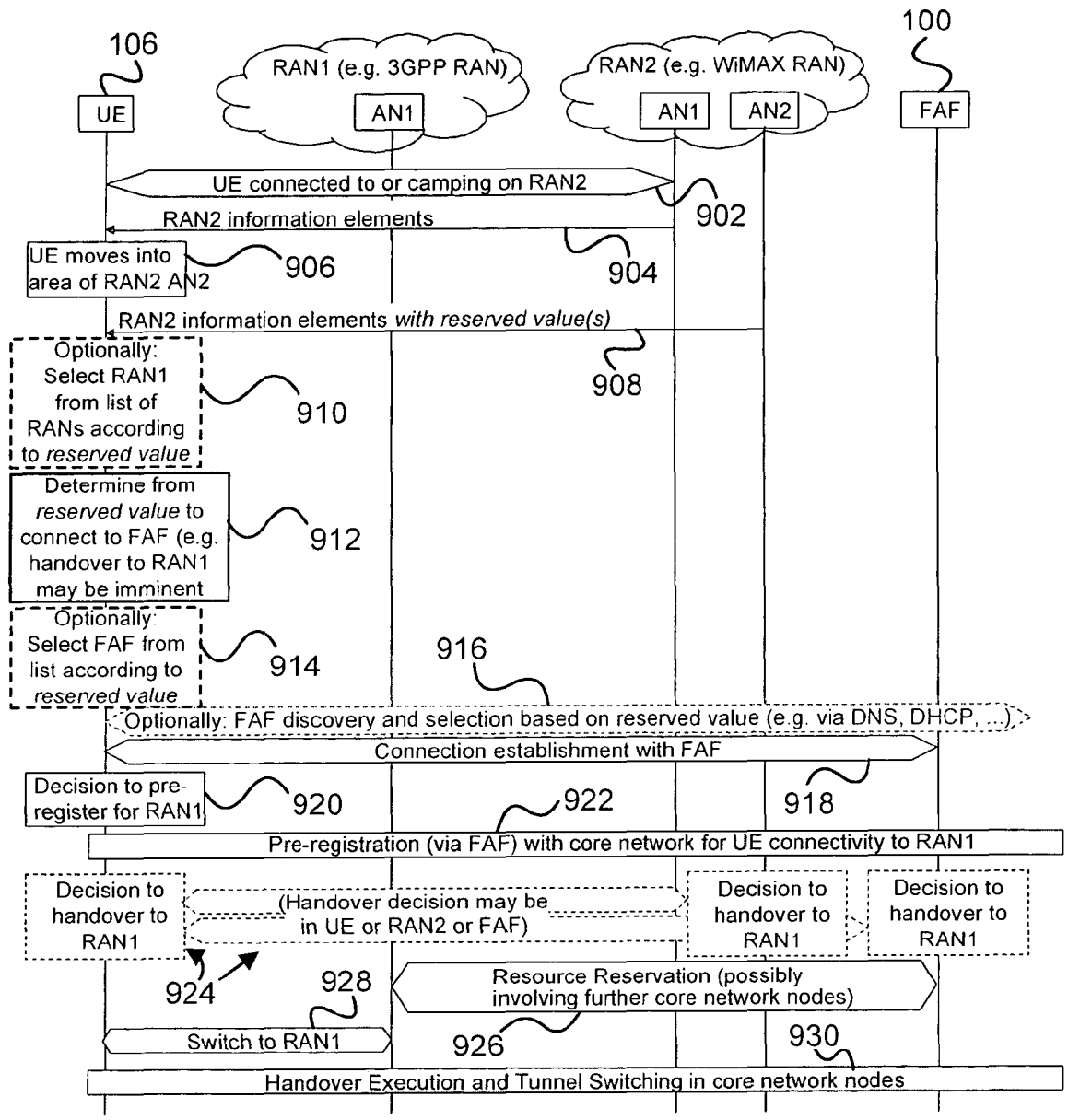
FIG. 9 schematically illustrates an embodiment of a network scenario.

FIG. 9 illustrates an example procedure according to which a handover from the WiMAX RAN2 to the 3GPP RAN1 of FIG. 8 is performed. Those aspects of the procedure of FIG. 9 which are similar to corresponding aspects of the procedure illustrated in FIG. 7 will not be repeated, i.e. some parts of the discussion of the procedure of FIG. 7 are similarly applicable to the procedure illustrated in FIG. 9.

In step 902, the UE 106 is served by AN1 of the WiMAX RAN2; for example the UE 106 may be connected to or camping on RAN2. The RAN2 AN1 is assumed to not serve cells of the coverage edge area 802 of FIG. 8. Thus, when neighbouring cell information is provided in step 904 to UE 106, such information comprises a list of WiMAX radio cells of RAN2. In step 906, the UE 106 moves into an area served by access node RAN2 AN2, which is assumed to serve cells belonging to the coverage edge area 802. The RAN2 AN2 has been administratively configured such that it provides, e.g. via broadcast, in step 908 neighbouring cell information to the UE 106 comprising a list of WiMAX radio cells of RAN2, and further comprising availability information related to RAN1. The considerations made above with regard to step 708 in FIG. 7 can similarly be applied to step 908.

The received information may for example comprise a list of cell IDs of RAN2 indicating neighbouring RAN2 cells may be provided, and may additionally comprise reserved values conforming to the normal RAN2 cell ID provisioning framework, wherein the reserved values indicate that the UE 106 is located in the coverage edge area 802 of RAN2. Optionally, an identifier for a particular FAF out of a plurality of such entities may also be comprised in the information. Further details regarding the availability information have been described in detail with regard to step 708 of FIG. 7.

The UE 106 detects one or more reserved values in the received neighbouring cell information. Further, the UE 106 determines from the reserved value(s) that it is located in the coverage edge 802 of RAN2. Depending on what in detail the UE 106 has determined from the reserved values, the UE 106 may start scanning for various access networks, and may in this way identify RAN2. Alternatively, the UE 106 may perform the optional step 910 of identifying the particular RAN1 from a list of RANs. In step 912, the UE 106 decides to connect to a FAF, for example because it has been determined based on the received reserved values that a handover to 3GPP RAN1 is or may be imminent.

In step 914, the UE 106 may perform the optional step of determining a specific FAF to connect to. For example, the UE 106 may select, based on the received reserve value, the FAF 100 from a list. Additionally or alternatively, the UE 106 may perform the optional step 916 of discovering and selecting a FAF based on the reserved value, for example based on DNS, DHCP, etc. In step 918, the UE 106 establishes connectivity with the FAF 100. For example the IPsec tunnel T1 illustrated in FIG. 1 may be established between UE 106 and FAF 100.

In step 920, the UE 106 decides to pre-register with RAN1. In step 922, the UE 106 pre-registers via the FAF 100 with the core network for establishing UE connectivity to RAN1, e.g. for establishing "suspended" bearers, etc. This may optionally be combined with requesting access network discovery information from an ANDSF or MIIS server.

In step 924, the UE 106 may decide to handover to RAN1. The decision may be communicated to FAF 100 which in turn triggers in step 926 corresponding resource reservations in RAN1. In step 928, the UE 106 switches to RAN1 and in step 930 the handover is performed.

The preparation phase for handover schematically indicated in FIG. 4, reference numeral 418 and FIG. 5, reference numeral 520, extends from step 712 to step 724 in FIG. 7 or from step 912 to step 924 in FIG. 9. A preparation phase starts with a decision regarding the connection to an interworking entity, i.e. a consideration of handover to a separate mobile access network with different access technology for which a connection to the interworking entity needs to be established. The preparation phase ends with the decision to actually initiate the handover (steps 724 and 924, respectively) or with the decision to not consider the separate mobile access network for handover, as shown in step 518 in FIG. 5. The preparation phase in FIG. 5 may start also with a positive decision regarding a connection to entity 506 (not shown in FIG. 5) to which a connection is established.

In general, multiple interworking entities such as the FAF 100 may be available for a mobile terminal for handover optimization. One problem in this respect is that for scalability and performance reasons the mobile terminal should connect to an interworking entity which is close to the terminal from a network perspective. Below a FAF discovery procedure is proposed, according to which the mobile terminal may discover the best suited FAF based on its current location.

Figure 10:
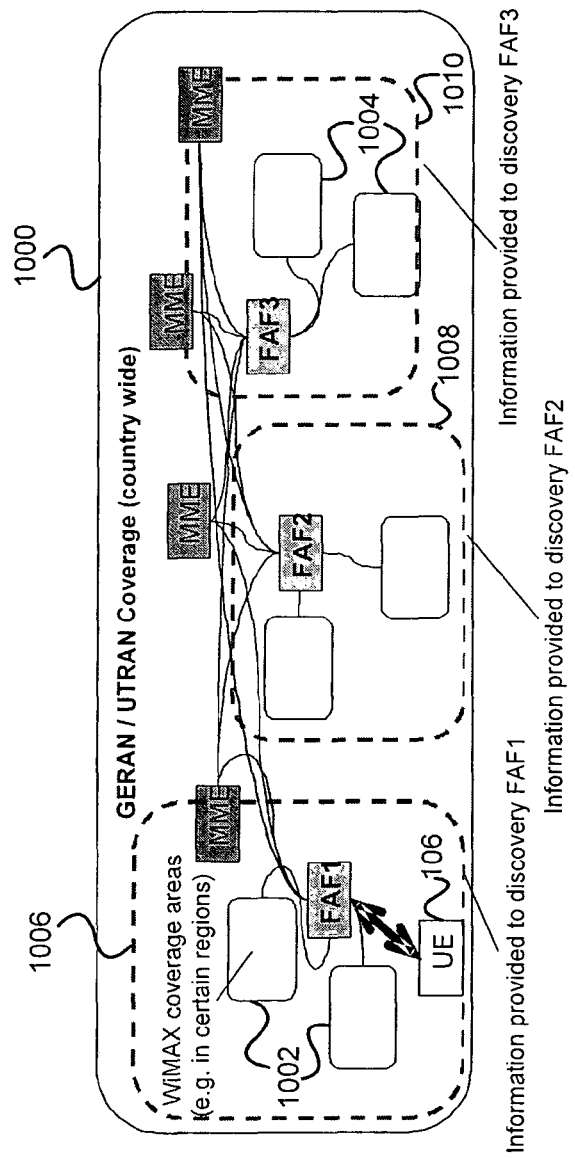
FIG. 10 illustrates a procedure for FAF discovery.

FIG. 10 schematically illustrates a coverage area 1000, which may for example be comprised in one or more of the RANs 102 of FIG. 1. The RAN 1000 has various FAFs associated therewith, which are referred to as FAF1, FAF2 and FAF3. FAF1 may for example be FAF 100 of FIG. 1. The FAFs are interconnected with multiple MMES. Each of the FAFs is associated with one or more WiMAX coverage areas. For example, FAF1 is associated with WiMAX coverage areas 1002 and FAF3 is associated with WiMAX coverage areas 1004. By administrative action base stations of RAN 1000 serving particular geographic areas 1006, 1008 and 1010 have been configured to provide specific availability information to the mobile terminals in that areas, wherein the availability information allows to discriminate which FAF is suitable for the mobile terminal located in one of the areas 1006, 1008 or 1010. For example, the UE 106 located in coverage area 1006 receives availability information comprising a reserved neighbouring cell value indicating that the UE 106 may connect to FAF1 for handover preparation to one of the WiMAX coverage areas 1002. Different reserved values may be provided to the mobile terminals in different of regions 1006, 1008 and 1010, or the mobile terminal may otherwise be enabled to identify the closest FAF.

The UE may determine which FAF to connect to depending on the reserved value that it has received. The mapping of a reserved value to a particular FAF can be achieved according to a variety of different procedures, wherein in any case the reserved value of the received information element is used in order to determine the suitable FAF. As a first example, the mobile terminal can be provisioned at manufacturing time or via a (re)configuration using device management functions with a mapping of reserved values to FAF identifiers. Additionally or alternatively, the UE may also request the FAF identity from a server such as an ANDSF or MIIS server by providing the received reserved value thereto. As a still another possibility, the FAF address may be composed from a reserved value, for example when the reserved value is part of the fully qualified domain name of the FAF.

Figure 11:
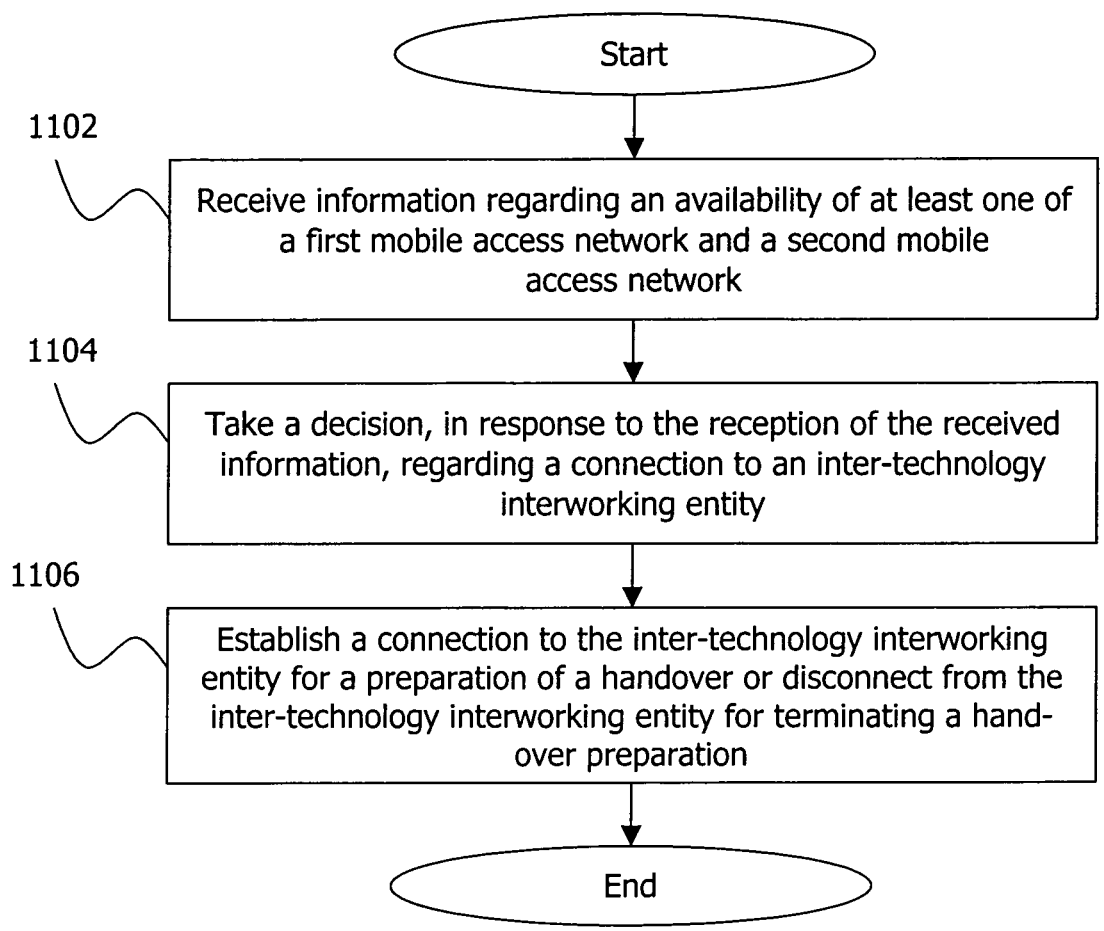
FIG. 11 schematically illustrates an embodiment of a method for preparing a handover performed by a mobile terminal.

FIG. 11 illustrates a further exemplary embodiment of a method for optimizing efficiency in a situation for a possible handover of a mobile terminal from a first mobile access network according to a first mobile access technology to a second mobile access network according to a second mobile access technology different from the first mobile access technology. The method of FIG. 11 is performed in a mobile terminal.

In step 1102, information is received regarding an availability of at least one of the first mobile access network and the second mobile access network. In step 1104, in response to the reception of the received information, a decision is taken regarding a connection to an inter-technology interworking entity, said entity being adapted to interwork between the first access technology and the second access technology. In step 1106, based on the decision in step 1104, a connection to the inter-technology interworking entity is established for a preparation of the handover or disconnecting from the inter-technology interworking entity for terminating a handover preparation.

Figure 12:
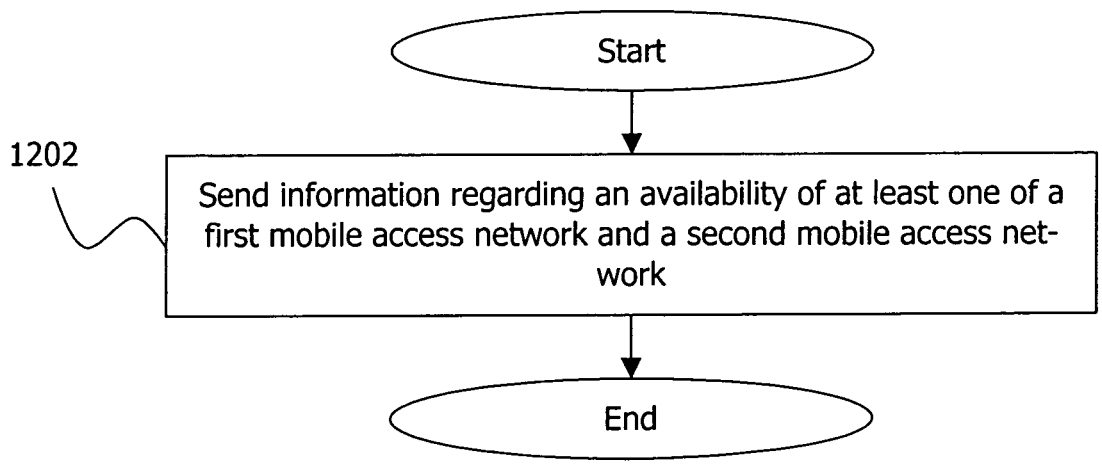
FIG. 12 illustrates an embodiment of a method for preparing a handover performed by a network entity.

FIG. 12 illustrates a still further exemplary embodiment of a method for optimizing efficiency in a situation for a possible handover of a mobile terminal from a first mobile access network according to a first mobile access technology to a second mobile access network according to a second mobile access technology different from the first mobile access technology. The method is performed by at least one entity in the first mobile access network. The method comprises the step 1202, wherein information regarding an availability of at least one of the first mobile access network and the second mobile access network is sent.

The techniques proposed herein enable optimizing an efficiency in a situation for a possible handover between mobile access networks employing different mobile access technologies, such as handovers between 3GPP access networks and non-3GPP access networks. According to the techniques a complex modification of the standardized provisioning of handover-related information such as neighbour cell information in 3GPP (or non-3GPP) frameworks can be avoided. With regard to the specific examples described above, for example the addition of new 3GPP specific neighbour cell lists for WiMAX access networks can be avoided (and vice versa).

Further, a transmission overhead due to a provisioning of the additional availability information regarding the availability of separate access networks with different access technologies can be minimized. In particular when using reserved values which may for example be predefined by standardization and/or network management, the availability information is provisioned embedded within conventional neighbour cell information (or location area information, etc.) to the mobile terminals.

Communicating information to the mobile terminal when an availability of the first and/or the second mobile access network changes provides for less network load, e.g. less messaging or signalling effort, and less processing at the involved entities.

The decision taken by the mobile terminal regarding the connection to the inter-technology interworking entity allows preparing for handover or terminating handover. In the first case, resources can be allocated for handover such that when the decision for handover is taken the handover can be executed in a fast manner. In the second case, a preparation for handover—for which a connection to the inter-technology interworking entity is a prerequisite—is terminated at an early point in time. Thus no resources are wasted for preparing and/or maintaining the connection to the inter-technology interworking entity. Therefore with the proposed techniques efficiency is generally optimized in a situation in which a handover is possible, irrespective of whether the handover is in fact executed later on.

According to the proposed techniques the discovery of any kind of non-3GPP access can efficiently be implemented based on, for example, the FAF interworking entity which is currently proposed by the 3GPP for optimized handover between WiMAX and 3GPP networks.

While the current invention has been described in relation to its preferred embodiments, it is to be understood that this description is for illustrative purposes only. Accordingly, it is intended that the invention be limited only by the scope of the claims appended hereto.

The invention claimed is:

1. A method implemented by a mobile terminal for efficient preparation of a possible handover from a first mobile access network implementing a first mobile access technology to a second mobile access network implementing a second mobile access technology different from the first mobile access technology, wherein either the first mobile access technology is a 3GPP technology and the second mobile access technology is a non-3GPP technology or the first mobile access technology is a non-3GPP technology and the second mobile access technology is a 3GPP technology, the method comprising:

receiving a list of cell values of the first mobile access network from the first mobile access network either periodically or in response to a change of availability of at least one of the first and second mobile access network;

determining that one or more values in the list indicate information about cells of the first mobile access network and that one or more other cell values in the list indicate an availability of the second mobile access network for handover, wherein the one or more other cell values have been reserved for indicating said availability;

responsive to determining that said one or more other cell values indicate the availability of the second mobile access network, making a decision regarding a connection to an inter-technology interworking entity that is adapted to interwork between the first mobile access technology and the second mobile access technology; and based on said decision, establishing a connection to said inter-technology interworking entity in preparation for said possible handover, or disconnecting an already established connection to said inter-technology interworking entity in order to terminate preparation for said possible handover.

2. The method according to claim 1, further comprising sending information from the mobile terminal to the inter-technology interworking entity via an established connection for initiating said possible handover.

3. The method according to claim 2, further comprising connecting to the second mobile access network responsive to the initiation of said possible handover.

4. The method according to claim 2, further comprising disconnecting from the first mobile access network responsive to the initiation of said possible handover.

5. The method according to claim 1, further comprising determining an address of the inter-technology interworking entity.

6. The method according to claim 5, wherein said determining the address of the inter-technology interworking entity comprises determining said address from a database of the mobile terminal or from a database accessible via the first mobile access network.

7. The method according to claim 1, wherein said inter-technology interworking entity comprises one of a plurality of inter-technology interworking entities and wherein said information further indicates to which inter-technology interworking entity the mobile terminal is to connect.

8. The method according to claim 1, further comprising analyzing said information as a basis for making said decision.

9. The method according to claim 1, further comprising, after a connection to the inter-technology interworking entity has been established, making a decision regarding initiation of said possible handover.

10. The method according to claim 9, wherein making a decision regarding initiation of said possible handover comprises assessing at least one of:

a probability of successfully connecting to the second mobile access network, and criteria related to a service being offered to the mobile terminal.

11. The method according to claim 1, wherein making a decision regarding a connection to an inter-technology interworking entity comprises assessing at least one of:

a probability of successfully connecting to the second mobile access network, and criteria related to a service being offered to the mobile terminal.

12. The method according to claim 1, wherein information regarding an availability of the first mobile access network or the information regarding the availability of the second mobile access network is received by the mobile terminal whenever the respective availability changes.

13. The method according to claim 1, wherein the first mobile access technology is defined according to a first standard and the second mobile access technology is defined by a second standard different from the first standard.

14. The method according to claim 1, wherein receiving said information comprises receiving the information via a connection between the mobile terminal and the first mobile access network.

15. The method according to claim 1, wherein said one or more cells values that have been reserved for indicating said availability indicate that a connection to the second mobile access network is or will become feasible.

16. The method according to claim 1, further comprising receiving information regarding an availability of the first mobile access network, that information indicating that a connection to the first mobile access network will no longer be feasible.

17. A method implemented by an entity in a first mobile access network, implementing a first mobile access technology, for efficient preparation of a possible handover of a mobile terminal from the first mobile access network to a second mobile access network implementing a second mobile access technology different from the first mobile access technology, wherein either the first mobile access technology is a 3GPP technology and the second mobile access technology is a non-3GPP technology or the first mobile access technology is a non-3GPP technology and the second mobile access technology is a 3GPP technology, the method comprising sending to the mobile terminal a list of cell values of the first mobile access network either periodically or in response to a change of availability of at least one of the first and second mobile access network, wherein one or more values in the list indicate information about cells of the first mobile access network and one or more other cell values in the list indicate an availability of the second mobile access network for said possible handover, wherein the one or more other cell values have been reserved for indicating said availability.

18. The method according to claim 17, further comprising:
receiving an instruction from an inter-technology interworking entity to disconnect the mobile terminal from the first mobile access network, said inter-technology interworking entity adapted to interwork between the first mobile access technology and the second mobile access technology, and
disconnecting the mobile terminal from the first mobile access network.

19. The method according to claim 17, wherein sending said information comprises sending the information to the mobile terminal via a connection between the mobile terminal and the first mobile access network.

20. The method according to claim 17, wherein said one or more cells values that have been reserved for indicating said availability indicate that a connection to the second mobile access network is or will become feasible.

21. The method according to claim 17, further comprising sending to the mobile terminal information regarding an availability of the first mobile access network, that information indicating that a connection to the first mobile access network will no longer be feasible.

22. A mobile terminal configured for efficient preparation of a possible handover from a first mobile access network implementing a first mobile access technology to a second mobile access network implementing a second mobile access technology different from the first mobile access technology, wherein the mobile terminal comprises:
a receiving circuit configured to receive a list of cell values of the first mobile access network from the first mobile access network either periodically or in response to a change of availability of at least one of the first and second mobile access network;
a processing circuit configured to:
determine that one or more values in the list indicate information about cells of the first mobile access network and that one or more other cell values in the list indicate an availability of the second mobile access network for handover, wherein the one or more other cell values have been reserved for indicating said availability; and
responsive to determining said one or more other cell values indicate the availability of the second mobile access network, make a decision regarding a connection to an inter-technology interworking entity that is adapted to interwork between the first mobile access technology and the second mobile access technology; and
a transmission circuit configured to, based on said decision, establish a connection to said inter-technology interworking entity in preparation for said possible handover, or disconnect an already established connection to said inter-technology interworking entity in order to terminate preparation for said possible handover.

23. The mobile terminal according to claim 22, wherein said inter-technology interworking entity comprises one of a plurality of inter-technology interworking entities and wherein said information further indicates to which inter-technology interworking entity the mobile terminal is to connect.

24. An entity in a first mobile access network implementing a first mobile access technology, the entity configured for efficient preparation of a possible handover of a mobile terminal from the first mobile access network to a second mobile access network implementing a second mobile access technology different from the first mobile access technology, wherein either the first mobile access technology is a 3GPP technology and the second mobile access technology is a non-3GPP technology or the first mobile access technology is a non-3GPP technology and the second mobile access technology is a 3GPP technology, the entity comprising a transmission circuit configured to send to the mobile terminal a list of cell values of the first mobile access network either periodically or in response to a change of availability of at least one of the first and second mobile access network, wherein one or more values in the list indicate information about cells of the first mobile access network and one or more other cell values in the list indicate an availability of the second mobile access network for said possible handover, wherein the one or more other cell values have been reserved for indicating said availability.

25. The entity according to claim 24, further comprising a receiving circuit configured to receive an instruction from an inter-technology interworking entity to disconnect the mobile terminal from the first mobile access network, said inter-technology interworking entity adapted to interwork between the first mobile access technology and the second mobile access technology, and a processing circuit configured to disconnect the mobile terminal from the first mobile access network.

26. The entity according to claim 24, further comprising a processing circuit configured to trigger the sending of at least one message to the mobile terminal, the message comprising information regarding the availability of at least one of the first mobile access network and the second mobile access network.

* * * * *